United States Patent
Austin

(10) Patent No.: US 6,213,696 B1
(45) Date of Patent: Apr. 10, 2001

(54) CARGO RESTRAINT DEVICE

(75) Inventor: Donald M. Austin, Perkinsfield (CA)

(73) Assignee: M & C Corporation, Warren, MI (US)

( * ) Notice: Subject to any disclaimer, the term of this patent is extended or adjusted under 35 U.S.C. 154(b) by 0 days.

(21) Appl. No.: 09/510,584

(22) Filed: Feb. 22, 2000

(51) Int. Cl.$^7$ .......................................... B60P 7/00
(52) U.S. Cl. ............................................ 410/106; 410/101
(58) Field of Search ..................................... 410/101, 106, 410/107, 110, 116; 24/115 K, 265 CD; 248/499

(56) References Cited

U.S. PATENT DOCUMENTS

| | | |
|---|---|---|
| 283,320 | 5/1883 | Basinger . |
| 607,543 | 7/1898 | Keating . |
| 2,701,114 | 12/1949 | Donaldson . |
| 3,002,723 | 10/1961 | Daum . |
| 3,033,600 | 5/1962 | Drysdale . |
| 4,431,352 | * 2/1984 | Andrews ............................... 410/101 |
| 4,715,754 | * 12/1987 | Scully ................................... 410/107 |
| 4,818,162 | * 4/1989 | Zukowski et al. .................... 410/116 |
| 5,052,869 | * 10/1991 | Hansen II ............................. 410/111 |
| 5,180,263 | * 1/1993 | Flower, Jr. ............................ 410/106 |
| 5,248,176 | * 9/1993 | Fredriksson ...................... 410/101 X |
| 5,774,948 | * 7/1998 | Petschke et al. ................. 410/101 X |
| 6,065,917 | * 5/2000 | Shambeau et al. ................... 410/107 |

FOREIGN PATENT DOCUMENTS 1433279    4/1976   (GB) .

* cited by examiner

*Primary Examiner*—Stephen T. Gordon
(74) *Attorney, Agent, or Firm*—Brooks & Kushman P.C.

(57) ABSTRACT

A cargo restraint has a D-ring with cold-headed opposed end portions spaced slightly apart and trapped in a gap in a passageway of an anchor bracket and tensioned against edges of the gap to prevent rattling and withdrawal of the ends of the D-ring out of the bracket.

4 Claims, 1 Drawing Sheet

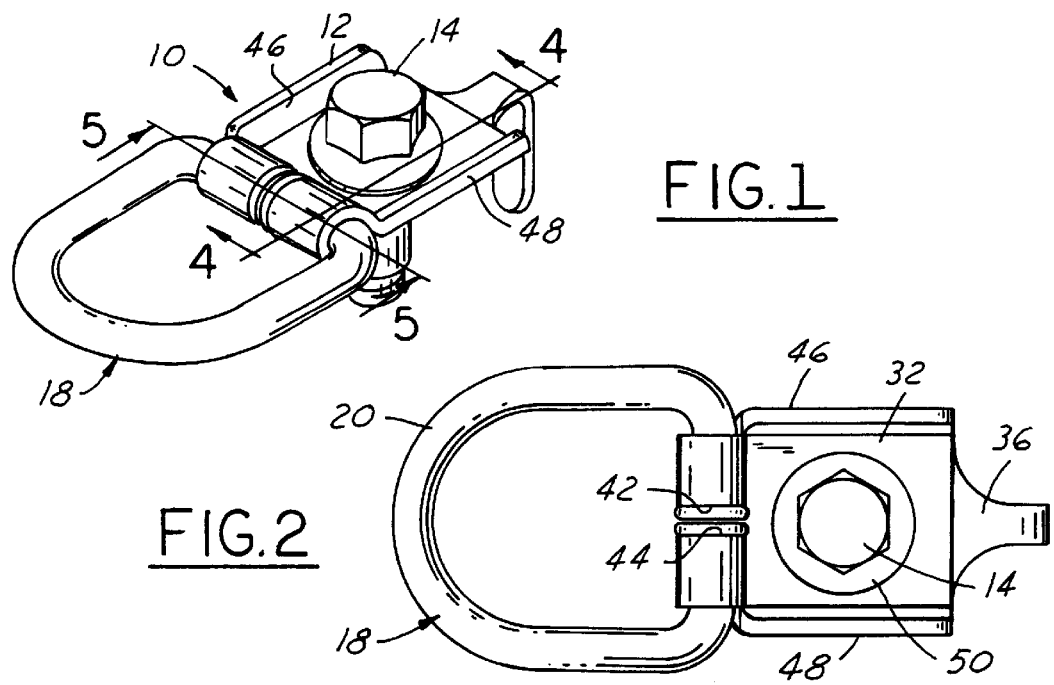
FIG. 1
FIG. 2
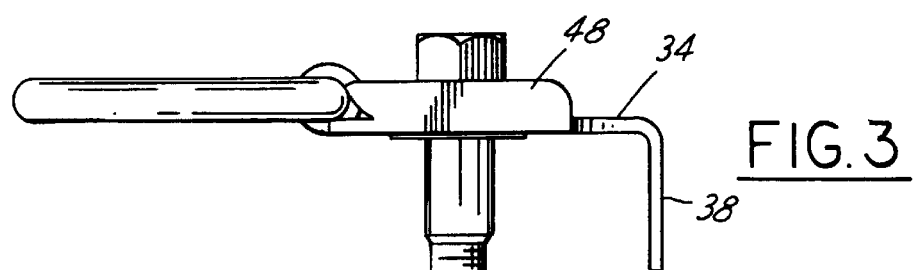
FIG. 3
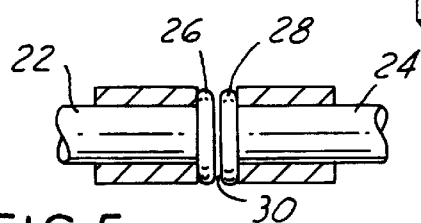
FIG. 5
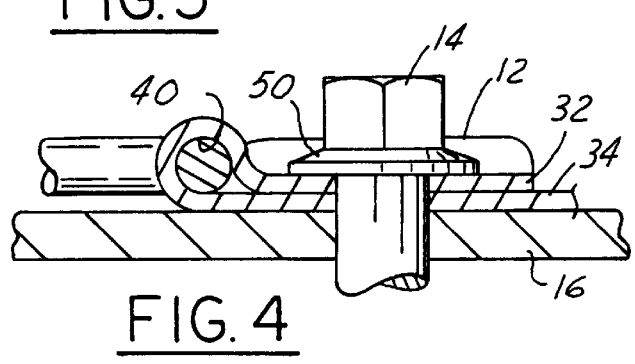
FIG. 4
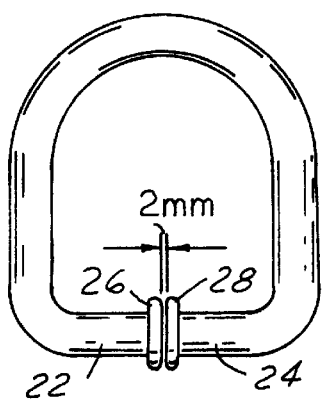
FIG. 6

CARGO RESTRAINT DEVICE

FIELD OF INVENTION

This invention relates to cargo restraint devices for providing anchorage for cargo or a child seat in an automotive vehicle.

BACKGROUND OF THE INVENTION

Various designs of cargo restraints or the like are shown in the following U.S. Pat. Nos. 283,320; 607,543; 2,701,114; 3,002,723; 3,033,600; 5,248,176; and British 1,433,279. This art suggests that it is old to utilize a D-ring or the like with an anchor bracket which can swivel around a fastener projecting through the bracket for attaching it to a member upon which the cargo restraint is to be mounted. In British Patent 1,433,279, a ring for receiving a seat belt strap has coaxially aligned ends received in a cylindrical passageway at one edge of the bracket with ends of the ring projecting laterally slightly into an opening formed in a wall of the bracket.

Problems with prior art restraint devices of the character shown in the aforementioned patents and in other restraint devices which have been on the market is that such devices are not capable of withstanding the shock loadings occurring when automotive vehicles are involved in crashes. The ends of the D-ring have pulled out of the anchor brackets. To overcome this deficiency, it has been suggested that the ends of the D-ring be welded together. Such welding increases the cost of the restraint device and requires a secondary manufacturing operation.

SUMMARY OF THE INVENTION

My cargo restraint device which is useful in anchoring cargo or a child seat in an automotive vehicle allows the D-ring to pivot in the anchor bracket with a slight friction which is sufficient to prevent rattling, binding or problems of alignment of the D-ring in the anchor bracket. Importantly, the ends of the D-ring are cold-headed and spaced slightly apart such that upon assembling the D-ring to the bracket, the cold-headed ends of the D-ring may be squeezed slightly together and after the ends are enclosed by the bracket, the ends are released and will then bear against opposed surfaces of the bracket not only to prevent withdrawal of the ends from the anchor bracket but also provide the anti-rattling feature heretofore mentioned.

BRIEF DESCRIPTION OF THE DRAWINGS

FIG. 1 is a perspective view of my improved cargo restraint device;

FIG. 2 is a top plan view of the cargo restraint device;

FIG. 3 is a side elevation of my improved cargo restraint device;

FIG. 4 is a cross-sectional view taken on the line 4—4 of FIG. 1;

FIG. 5 is a cross-sectional view taken on the line 5—5 of FIG. 1; and

FIG. 6 is a plan view of a D-ring usable in my cargo restraint device.

BRIEF DESCRIPTION OF THE PREFERRED EMBODIMENT

Referring now to the drawings, the cargo restraint 10 comprises an anchor bracket 12, a fastener 14 projecting through the anchor bracket for attaching the same to a member 16 to which the cargo (not shown) is to be tethered by D-ring 18. The anchor bracket 12 is formed of sheet metal folded upon itself and around the D-ring to entrap the D-ring in the bracket such that the ring may be swung vertically on the bracket to position it in line with the cargo loading.

The D-ring 18 is formed of stiffly resilient steel rod having a closed loop configuration with a bight portion 20 of generally U-shaped configuration terminating in axially aligned opposed linearly extending end portions 22 and 24, themselves terminating in cold-headed ends 26 and 28, spaced apart axially to provide a gap 30 therebetween of approximately 0.2 mm. Such gap enables the ends 22 and 24 to be squeezed toward each other when the anchor bracket 12 is wrapped about end portions 22 and 24 as hereinafter described. End portions 22 and 24 of the D-ring 18 are of cylindrical configuration with cold-headed ends 26 and 28 projecting radially beyond the diameter of the end portions 22 and 24 as best shown in FIGS. 5 and 6.

The anchor bracket 12 is formed of sheet steel or other suitably strong material and has upper and lower leaves 32 and 34 respectively of generally square configuration in plan view as shown in FIGS. 1 and 2. The lower leaf has a tail portion 36 terminating in a depending projection 38 for reception in an aperture (not shown) in the member 16 to lock the anchor bracket in a predetermined rotated position. At the opposite edge of the anchor bracket from the tail portion 36, the bracket is shaped or formed to provide a generally cylindrical passageway 40 interrupted by a gap perpendicular to the axis of the cylindrical passageway and defined by axially spaced apart edges 42 and 44 of the bracket material forming the cylindrical passageway 40 and best shown in FIGS. 2 and 5. The leaves 32 and 34 of the anchor bracket are formed around the end portions 22 and 24 of the D-ring to provide the passageway 40 and at the time of such formation the D-ring is squeezed urging the end portions 22 and 24 into abutting relation. The gap in the cylindrical passageway 40 has the opposed surfaces 42 and 44 spaced apart a distance slightly less than the distance between the backsides of the cold-headed ends 26 and 28, such that after the anchor bracket has been formed around such end portions to trap the cold-headed ends 26 and 28, the squeezing action on end portions 22 and 24 may be released to permit cold-headed ends to spring back and engage the edges 42 and 44 of the bracket. The lower leaf 34 of the bracket along the edges extending from the tail 36 to the cylindrical passage 40 are shaped to provide angularly upwardly extending reinforcing flanges 46 and 48 to stiffen the leaf, and the upper leaf 32 nests between such upwardly turned flanges as best shown in FIGS. 1 and 2. An aperture through the leaves allows for the passage of the fastener 14 with a flange 50 of the fastener overlying the upper leaf 32 as best shown in FIGS. 1, 2 and 4.

Before formation of the bracket around the end portions 22 and 24 as above described, the leaves 32 and 34 are slotted to provide the gap defined by the edges 42 and 44, and then the D-ring is laid on the leaves and the leaves are formed around the end portions 22 and 24 into the configuration best shown in FIG. 4.

With the cold-headed ends 26 and 28 disposed in the transverse slot or gap in the cylindrical passageway 40 and with the cold-headed ends 26 and 28, tension slightly against the edges 42 and 44, the D-ring will not rattle in the bracket and will tend to remain in a rotated position in which it is placed relative to the bracket. As a result of this construction, the pair of opposed linearly extend end portions 22 and 24 having the cold-headed ends 26 and 28, cannot be withdrawn from the bracket. The fastener 14 prevents the leaves from opening up and the cold-headed ends 26 and 28 prevent the end portions 22 and 24 from being pulled out of the passageway. Also, this construction avoids the necessity of welding the ends of the end portions 22 and 24 together, thus reducing the cost of manufacture, and the tensioning of the cold-headed ends against the confronting edges of the bracket eliminates undesirable rattling.

Thus, I have provided a cargo restraint useful as a child seat tether which will withstand the loads specified for such tethers. Heretofore, the ends of D-rings which were not welded together or to the anchor brackets were too weak to withstand the tether loads. In the absence of a construction of the character I have disclosed herein, I found it necessary to weld the ends of the D-ring in order to prevent their withdrawal from the bracket. My construction and design avoids this requirement.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A cargo restraint for attachment to a member to which a cargo is to be tethered comprising, in combination:

an anchor bracket adapted to overlie a surface of the member to which the cargo restraint is to be attached;

a fastener projecting through the anchor bracket for attaching the same to said member;

said bracket formed to provide a generally cylindrical passageway interrupted by a gap defined by axially spaced apart edges of the bracket surrounding the passageway;

a stiffly resilient cargo ring having a pair of opposed linearly extending end portions for reception in said cylindrical passageway and terminating in opposed spaced apart cold-headed ends; and said cold-headed ends disposed in said gap to prevent withdrawal of the ring from the passageway, and tensioned linearly apart and against the axially spaced apart edges of the bracket to prevent rattling when the restraint is not subjected to a cargo loading.

2. The invention defined by claim 1 in which the end portions of the ring is formed of cylindrical rod material.

3. The invention defined by claim 1 wherein the bracket is formed with a lower leaf having opposed upwardly extending marginal flanges and an upper leaf is nested on the lower leaf between such flanges with said fastener projecting through the leaves and having a reinforcing flange overlying the upper leaf to prevent separation of the leaves when the ring is subjected to cargo loading.

4. The invention defined by claim 1 wherein said bracket is formed of a single piece of sheet metal rolled around said pair of opposed linearly extending end portions to form said cylindrical passageway with the cold-headed ends locked in the passageway by said gap.

\* \* \* \* \*